US005550794A

United States Patent [19]

Born et al.

[11] Patent Number: 5,550,794

[45] Date of Patent: Aug. 27, 1996

[54] WATCH INCLUDING AN ARRANGEMENT INDICATING THE MAGNETIC NORTH

[75] Inventors: Jean-Jacques Born, Morges; Etienne Bornand, Boudry, both of Switzerland

[73] Assignee: Asulab S.A., Bienne, Switzerland

[21] Appl. No.: 504,580

[22] Filed: Jul. 20, 1995

[30] Foreign Application Priority Data

Jul. 26, 1994 [CH] Switzerland .......................... 02353/94

[51] Int. Cl.[6] .............................. G04B 47/06; G01C 9/00

[52] U.S. Cl. .................................. 368/11; 368/14; 33/271

[58] Field of Search ................................ 368/10, 11, 14, 368/15, 20; 33/271, 355

[56] References Cited

U.S. PATENT DOCUMENTS

| | | | |
|---|---|---|---|
| 3,545,199 | 12/1970 | Rice | 368/14 |
| 4,183,206 | 1/1980 | Porsche et al | 368/14 |
| 4,668,100 | 5/1987 | Murakami et al. | 368/14 |
| 4,702,612 | 10/1987 | Finger | 368/10 |

FOREIGN PATENT DOCUMENTS

| | | |
|---|---|---|
| 469489 | 11/1946 | Belgium . |
| 48296 | 3/1982 | European Pat. Off. . |
| 2438861 | 5/1980 | France . |
| 17742402 | 3/1902 | Switzerland . |
| 274909 | 7/1951 | Switzerland . |
| 324565 | 11/1957 | Switzerland . |
| 328782 | 3/1958 | Switzerland . |

*Primary Examiner*—Vit W. Miska

*Attorney, Agent, or Firm*—Sughrue, Mion, Zinn, Macpeak & Seas

[57] ABSTRACT

A watch including an arrangement (14) indicating the terrestrial magnetic north. Such terrestrial magnetic north indicating arrangement is fitted into the watch case (32) in a lateral peripheral region of the horological movement (2). Specifically, the terrestrial magnetic north indicating arrangement comprises a permanent magnet (16) mounted on a shaft (18) and a direction indicator (24) fixed to such shaft. In accordance with three specific embodiments, the watch according to the invention enables, firstly, indication of the north direction, secondly, any direction whatsoever permitting the user to follow a predetermined direction and, thirdly, the direction of Mecca from at least one place on the terrestrial globe where such user is located.

12 Claims, 7 Drawing Sheets

1

WATCH INCLUDING AN ARRANGEMENT INDICATING THE MAGNETIC NORTH

The present invention concerns a watch including an arrangement indicating the terrestrial magnetic north. Specifically, the invention concerns such a terrestrial magnetic north indicating arrangement, the active element of which is formed by a bipolar permanent magnet.

There is known from the German patent document G 8306716.7 a watch including a terrestrial magnetic north indicating arrangement (hereafter magnetic north). Such document describes a watch comprising a case in which is fitted an horological movement associated with coaxial analog time indicators. There is provided in such document a magnetic north indicating arrangement formed by an annular bipolar permanent magnet arranged between the horological movement and a dial of the watch, such annular permanent magnet being arranged in a manner such that its central axis is coaxial to the axes bearing the abovementioned time indicators.

The magnetic north indicating arrangement also includes a direction indicator fixed at a first end to the annular permanent magnet and arranged so that its second end appears in a circular slot provided in the dial of the watch in order to enable a user of such watch to locate the direction of the magnetic axis of the annular permanent magnet which is supposed to align itself with the direction of the terrestrial magnetic flux.

The watch including the arrangement for indicating the magnetic north described hereinbefore exhibits certain major drawbacks.

Initially, the placing of the permanent magnet between the horological movement and the dial of the watch increases the thickness of such watch, which goes against the constant concern of watchmakers to provide watches having a lesser thickness for reasons of comfort when the watch is worn on the wrist, and for aesthetic design reasons.

The placing of the annular permanent magnet coaxial to a central axis of the watch movement, that is to say, coaxial to the axis of the hands of such watch, is disadvantageous for the operation of the arrangement for indicating the magnetic north when the timekeeping movement comprises magnetic masses, that is to say, masses exhibiting a low magnetic reluctance. Such magnetic masses disturb the terrestrial magnetic field and orient the permanent magnet independently of such terrestrial magnetic field if such permanent magnet is not separated sufficiently from such magnetic masses, in particular from the power cell of an electronic movement.

Thereby, if the permanent magnet is placed in proximity to the magnetic masses of the horological movement, the magnetic north indicating arrangement does not operate correctly. If, on the other hand, the permanent magnet is moved away from the movement in order to diminish the attraction of the magnetic masses on such permanent magnet, the thickness of the watch is considerably increased, which deprives such a watch of any commercial future.

Additionally, the placing of the permanent magnet above a movement comprising magnetic masses has as consequence that the terrestrial magnetic flux is concentrated in the region defined by such magnetic masses. Thereby, the terrestrial magnetic flux density traversing the permanent magnet of the magnetic north arrangement is lessened. Thus, the effectiveness of such arrangement is diminished.

The purpose of the present invention is to overcome such drawbacks as mentioned hereinbefore in providing a watch comprising an arrangement for indicating the magnetic north, the placing of which does not affect the thickness of the watch or affects it only to a lesser degree and, conjointly, the magnetic functioning of which indicating arrangement

2 according to the invention, the invention concerns secondly a watch the horological movement of which comprises magnetic masses, in particular an electronic horological movement, the permanent magnet of the magnetic north indicating arrangement being placed in the watch case as described hereinbefore, and at a distance sufficient from said magnetic masses, so that its minimum energy position is basically determined by the terrestrial magnetic flux traversing the watch.

According to specific characteristics of the invention, the permanent magnet is formed by a ring mounted directly onto a shaft of relatively small diameter in a manner such that the permanent magnet is included in a restrained volume of the watch case, the direction indicator having a longitudinal dimension greatly superior to the radial dimension of the annular permanent magnet and being formed from a non-magnetic material.

Thereby, the active element of the magnetic north indicating arrangement formed by the permanent magnet can be moved away from the magnetic masses of the horological movement comprised in the watch in being placed at the edge of the case of such watch without spoiling good reading of the magnetic north direction indicated by the direction indicator. Such direction indicator being nonmagnetic, it can, without more, approach the magnetic masses of the horological movement without this spoiling the precision and the sensitivity of the magnetic north indicating arrangement according to the invention.

Here it will be noted, given that the active element of the terrestrial magnetic north indicating arrangement and the direction indicator are materially separated from one another, it is foreseen, according to the invention, to orient the direction indicator relative to the magnetic axis of the permanent magnet in a manner such that such direction indicator is oriented precisely in the direction of terrestrial magnetic north when it is aligned on a positioning reference marker. The angular separation between the longitudinal axis of the direction indicator and the magnetic axis of the permanent magnet depends from the disturbance of the terrestrial magnetic field brought about by the magnetic masses present in the horological movement and from the position of the positioning reference marker mentioned hereinabove.

Another purpose of the invention is to provide a watch including an arrangement for the indication of the magnetic north such as described hereinbefore enabling a user having such watch on the wrist to follow a heading easily, that is to say to follow a predetermined direction relative to the terrestrial magnetic north.

Another purpose of the invention is to provide a watch comprising a magnetic north indicating arrangement such as described hereinbefore serving to indicate the direction of a given place from at least one other place. In particular the place the direction of which is given is Mecca.

Other characteristics and advantages of the present invention will be described hereinafter with the help of the following description prepared having reference to the annexed drawings, given by way of non-limiting examples.

Figure 7:
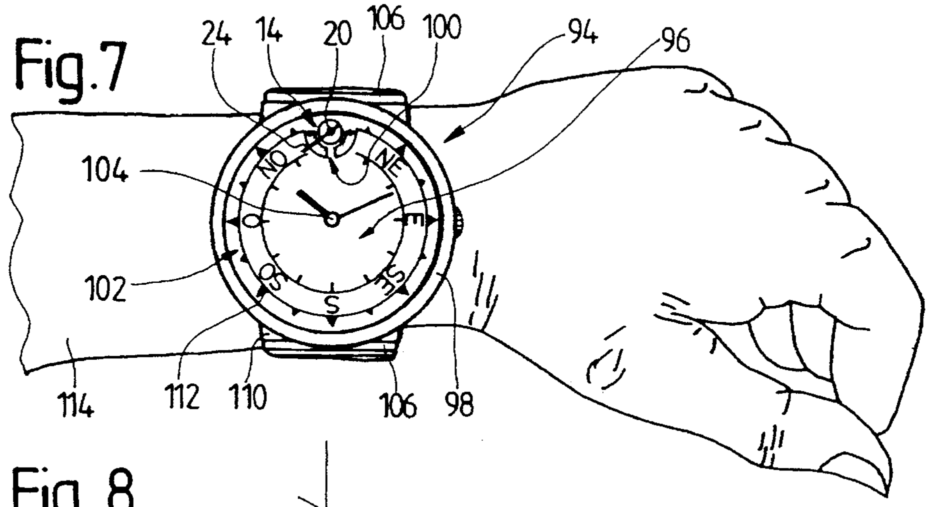
Figure 8:
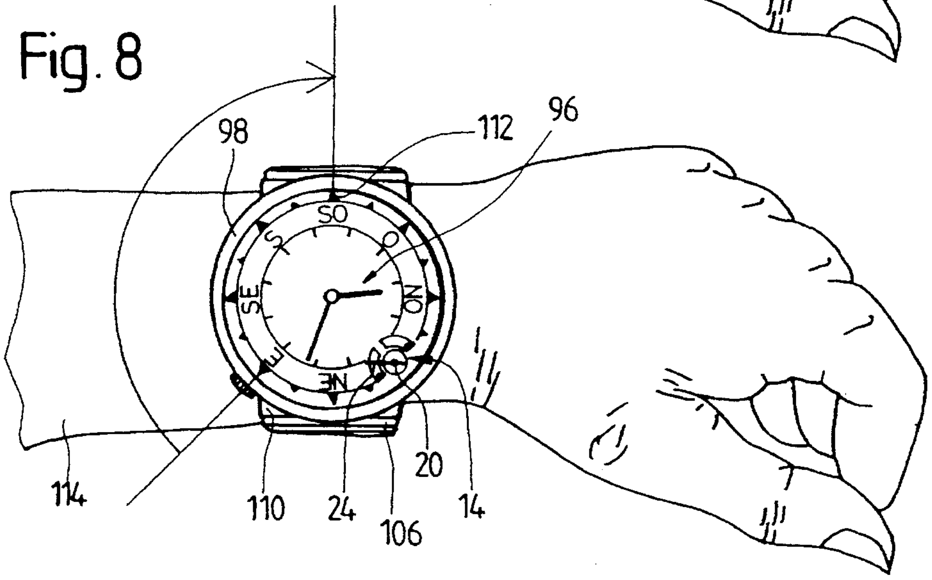
Figure 9:
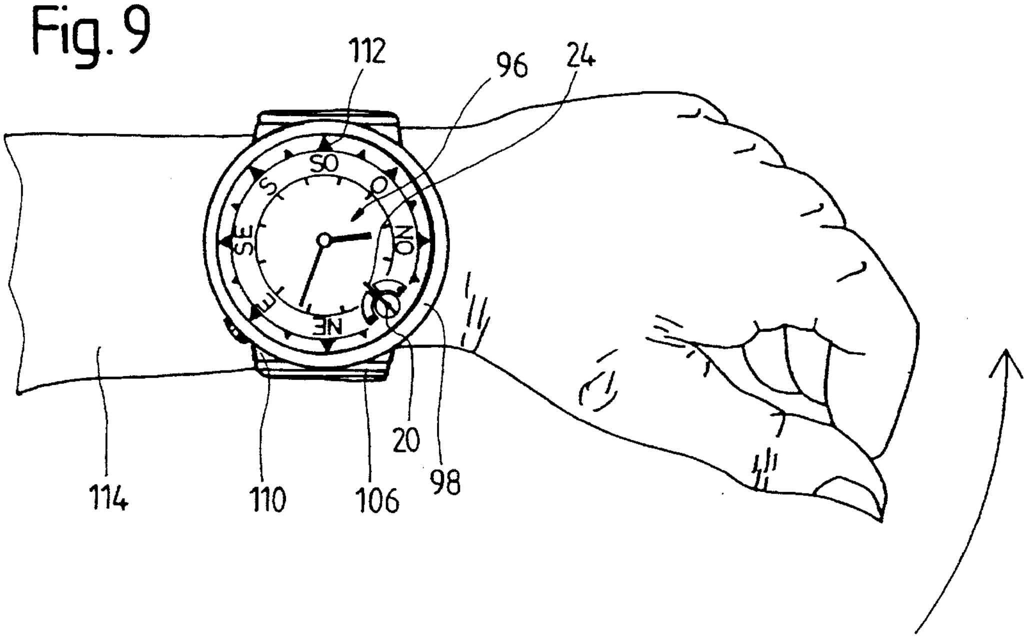
Figure 10:
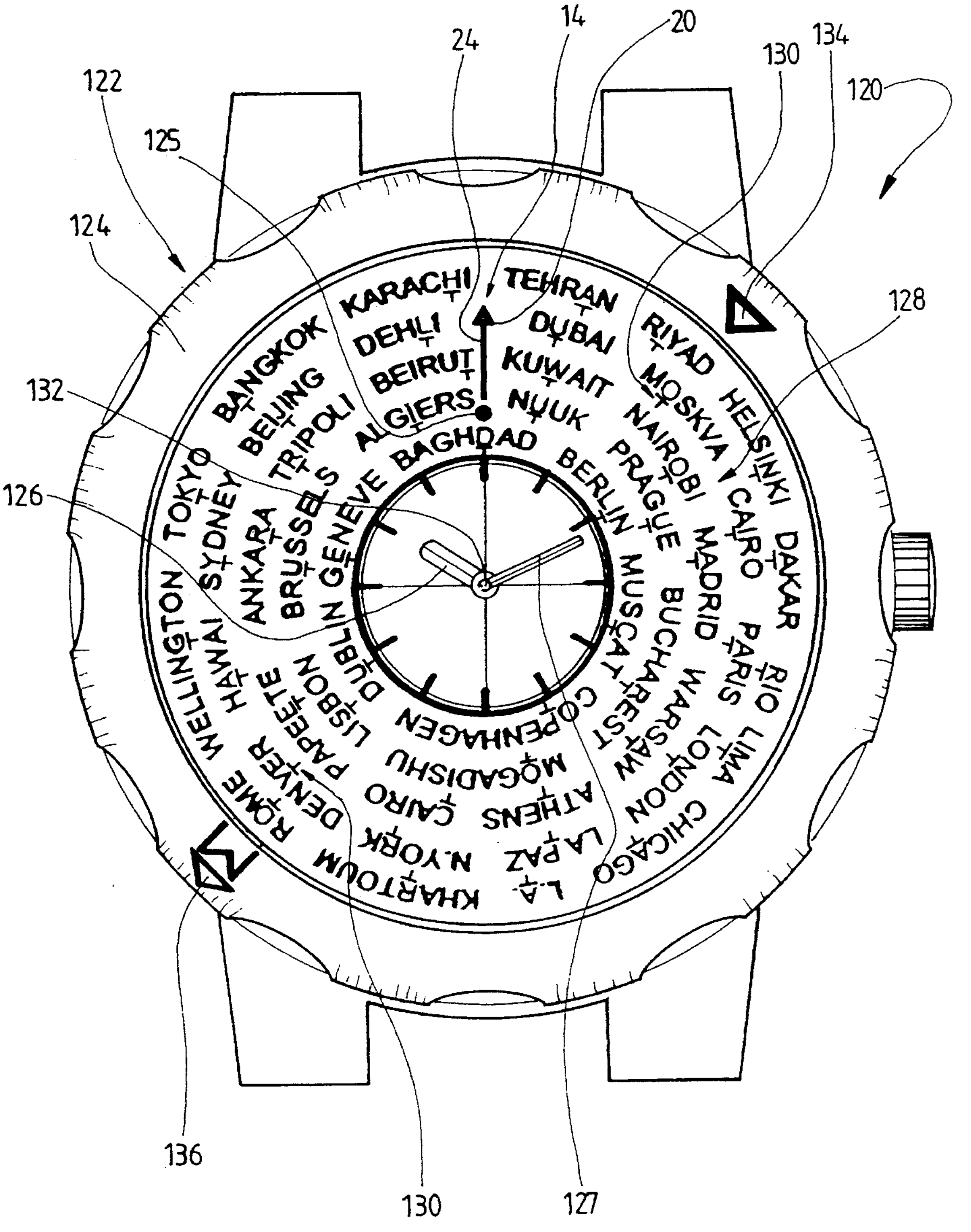

FIGS. 7 to 9 describe a third embodiment of a watch according to the invention serving to follow a predetermined direction and its method of operation;

FIG. 10 is a schematic view from above of a fourth embodiment of a watch according to the invention serving to indicate the direction of Mecca to a user.

With the help of FIG. 1, there will be described hereinafter a first embodiment of a watch according to the invention.

Figure 1:
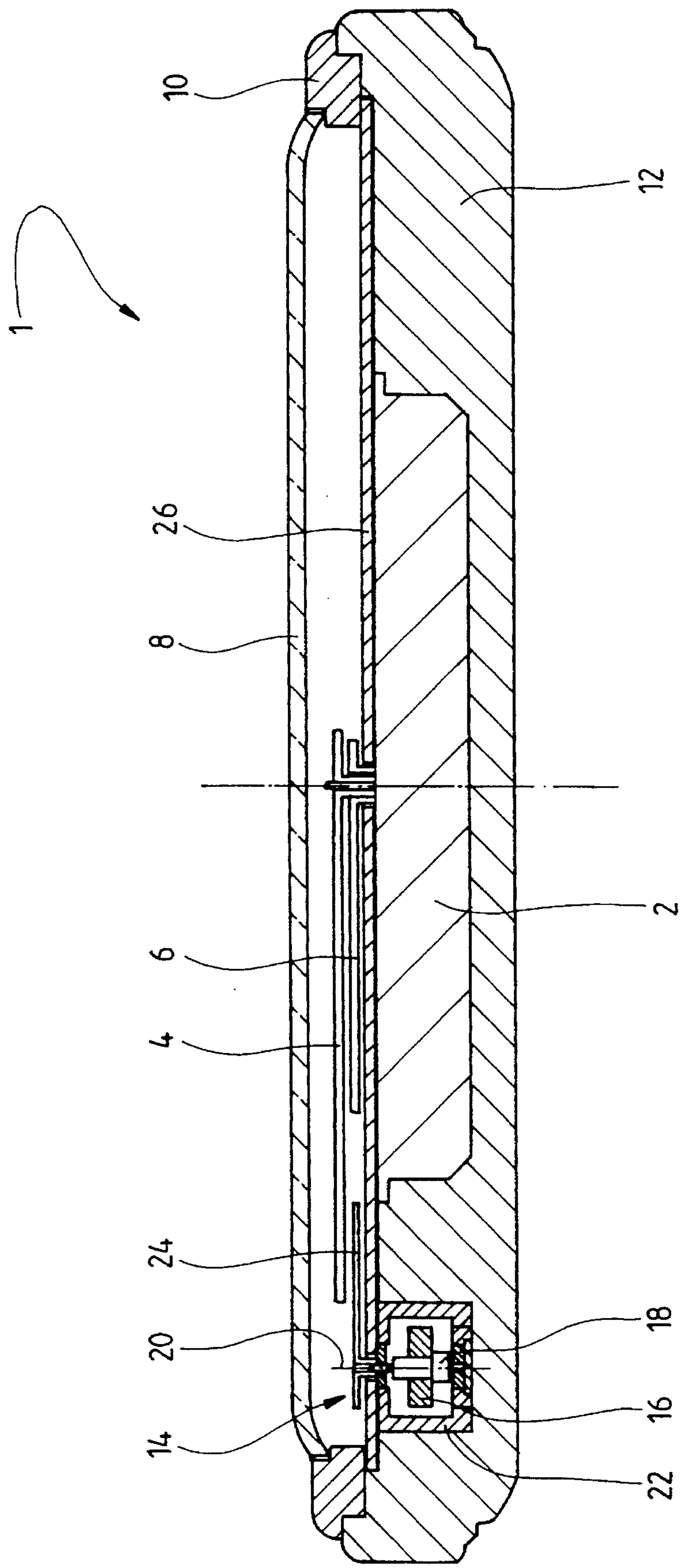
FIG. 1 is a cross-section of a first embodiment of the invention.

On such FIG. 1, watch comprises an horological movement 2 associated with two hands 4 and 6 serving as analog display of the time. Watch 1 further includes a crystal 8 secured in a bezel 10 and a caseband 12 also forming the back cover of the watch case.

Watch 1 also comprises an arrangement 14 for indicating the direction of the terrestrial magnetic north. Such arrangement 14 comprises a bipolar permanent magnet 16 mounted on a shaft 18 defining a rotation axis 20. The bipolar permanent magnet 16 defines a magnetic axis (not shown) perpendicular to the rotation axis 20.

Shaft 18 provided with the magnet 16 is housed in the interior of a cage 22. Such cage 22 is fitted into the caseband 12 in the lateral peripheral region exterior of the horological movement 2.

A direction indicator 24 is rigidly coupled to shaft 18. Such direction indicator 24 serves to indicate the direction of the magnetic north as will be described more precisely in what follows.

It will be noted that permanent magnet 16 is placed in the lateral peripheral region of the horological movement 2 and is located between dial 26 of watch 1 and the back cover of such watch. Specifically, it will be noted that the layout of the arrangement 14 in the present embodiment brings about absolutely no increase in the thickness of watch 1. The direction indicator 24 is fitted between dial 26 and crystal 8 of watch 1 at the same level as the hours hand 6, the minutes hand 4 being placed in a manner to pass above the direction indicator 24. Thereby, the direction indicator 24 does not bring about any increase in thickness of watch 1.

Figure 2:
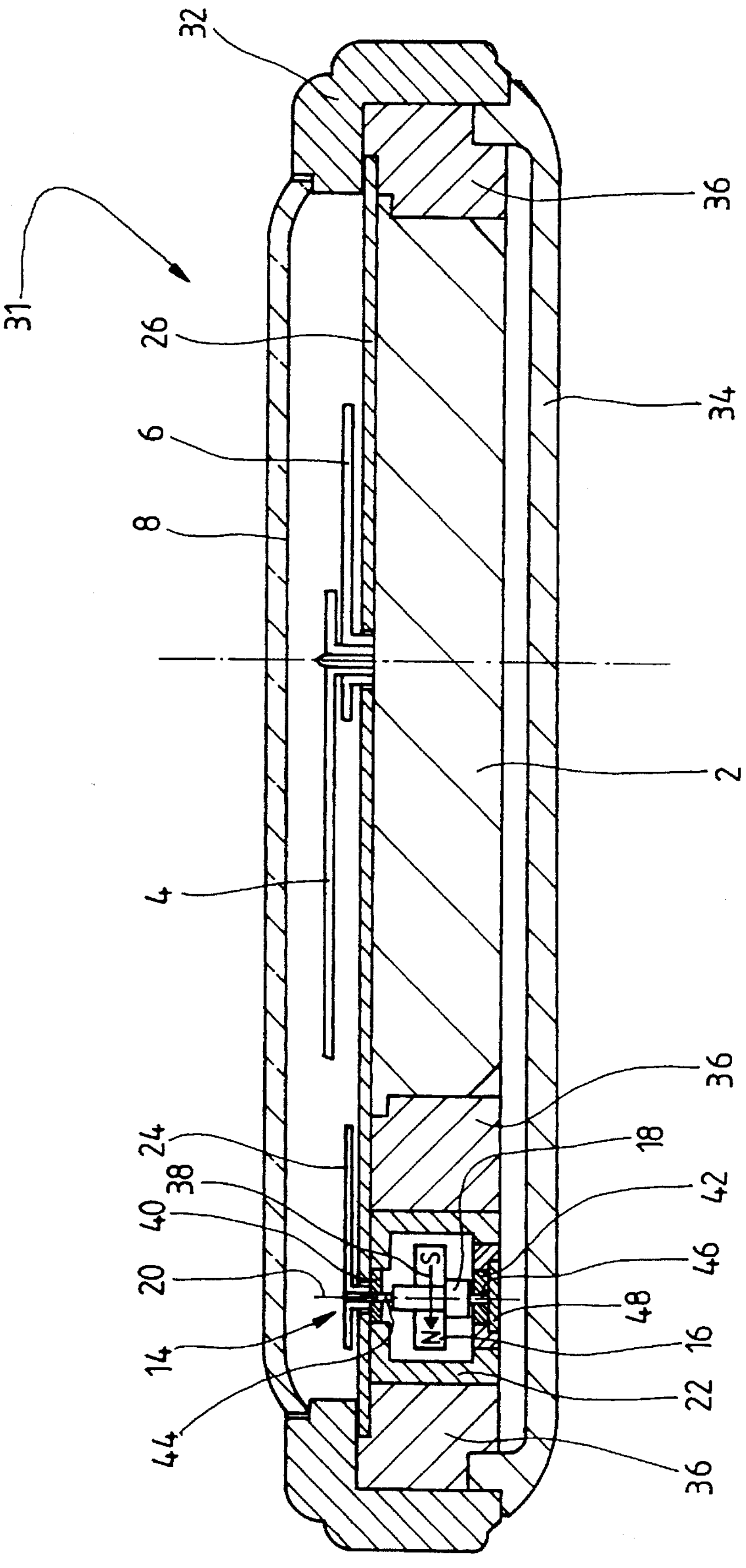
FIG. 2 is a cross-section of a first variant of the first embodiment of the invention.

On FIG. 2 is shown a variant of the first embodiment of FIG. 1. Watch 31 comprises a caseband 32 on on which is secured a crystal 8 and a separable back cover 34. The horological movement 2 is mounted in a casing ring 36 on the surface of which is provided dial 26 of watch 31. Such watch 31 also comprises an arrangement 14 for indication of the magnetic north identical to that described for FIG. 1, but arranged within the casing ring 36. Here it will be noted that the magnetic axis 38 of permanent magnet 16 has been shown on such FIG. 2. The other references already described on FIG. 1 will not be here described again in detail.

It will be again noted that the permanent magnet 16 is located in a peripheral region outside the horological movement 2. In this variant of the embodiment, the horological movement 2 is located in an off-centered manner relative to caseband 32. The placing of the arrangement 14 for indicating the direction of magnetic north again does not bring about any excessive thickness of watch 31.

The cage 22 fitted into the casing ring 36 includes two bearings 40 and 42 in which are respectively guided two pivots 44 and 46 of shaft 18. The first pivot 46, forming a first end of the shaft 18, rests on an endstone 48 fitted into the cage 22. Pivot 44, forming a second end of shaft 18, traverses bearing 40 and is extended beyond such bearing 40 so as to permit the pipe of hand 24, forming the direction indicator, to be rigidly secured to pivot 44.

Figure 3:
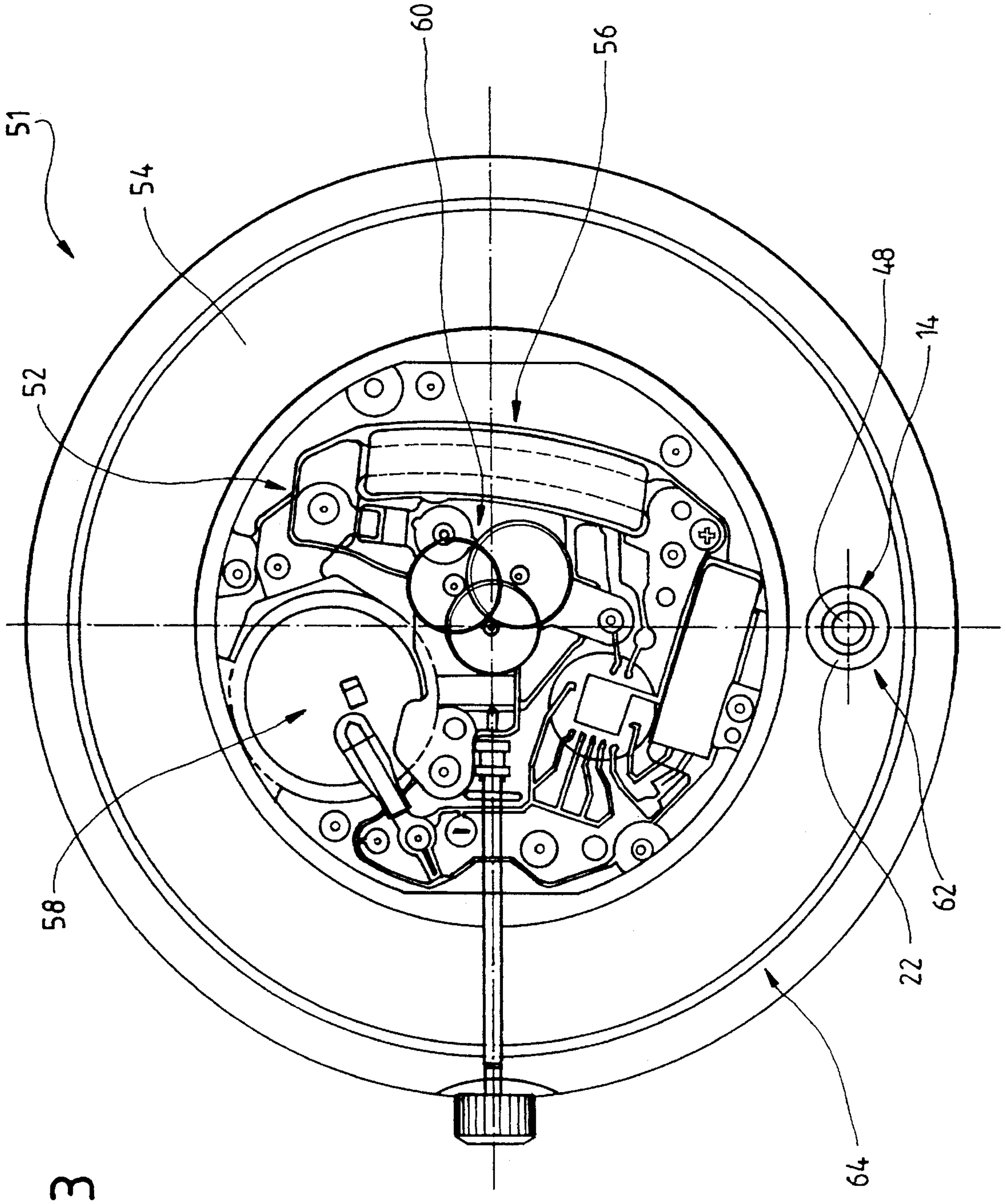
FIG. 3 is a view from below of a second variant equivalent to the first variant of the first embodiment of FIG. 2.

On FIG. 3 is shown a second variant of the first embodiment equivalent to the first variant described with the help of FIG. 2. On this FIG. 3 is shown a watch 51 seen from below and without its back cover. Such watch 51 comprises an horological movement 52 mounted in a casing ring 54. An arrangement 14 for indicating the direction of magnetic north similar to those described with the help of FIGS. 1 and 2 is fitted into the casing ring 54 in a manner equivalent to that of FIG. 2.

The horological movement 52 is an electronic movement, comprising in particular a motor 56 and a power cell compartment 58. The stator 60 of motor 56 and the power cell (not shown) fitted into the compartment 58 form magnetic masses, that is to say, masses of low magnetic reluctance readily conducting a magnetic flux.

The cage 22 of arrangement 14 for indicating the direction of magnetic north enclosing the permanent magnet (not visible on FIG. 3) of such arrangement 14 is localized in a region 62 relatively confined from the lateral peripheral region 64 of the horological movement 52. Specifically, cage 22 is separated from the magnetic masses of the horological movement 52 and is located, relative to the central axis of the horological movement 52, opposite the power cell compartment 58 intended to receive the power cell necessary for the energization of the horological movement 52.

Thus, the permanent magnet of the arrangement 14 for the indication of the direction of magnetic north is separated from the energizing power cell of the movement 52, such power cell being one of the principal magnetic elements disturbing the terrestrial magnetic flux traversing watch 51. During the fitting of horological movement 52 and arrangement 14 into watch 51, it must be ensured that the distance separating the permanent magnet of arrangement 14 from the magnetic masses of the horological movement 52 is sufficient so that the minimum energy position of the permanent magnet is basically determined by the terrestrial magnetic flux traversing watch 51.

Effectively, in the case in which the permanent magnet of arrangement 14 would be located in proximity to the magnetic masses of the horological movement 52, such magnetic masses and, in particular, their configuration, then determines the orientation of the permanent magnet of arrangement 14. In this latter case, such arrangement 14 would become entirely ineffective for indicating the direction of magnetic north given that the minimum energy position of the permanent magnet would be determined by the magnetic masses themselves. The present invention resolves this problem thanks to the layout of arrangement 14 for indicating the magnetic north and its positioning in watch 51 relative to the horological movement 52. Additionally, the invention resolves the problem of the effectiveness and of the sensitivity of the arrangement 14 for indicating the magnetic north without thereby bringing about an increase of the thickness of watch 51.

Figure 4:
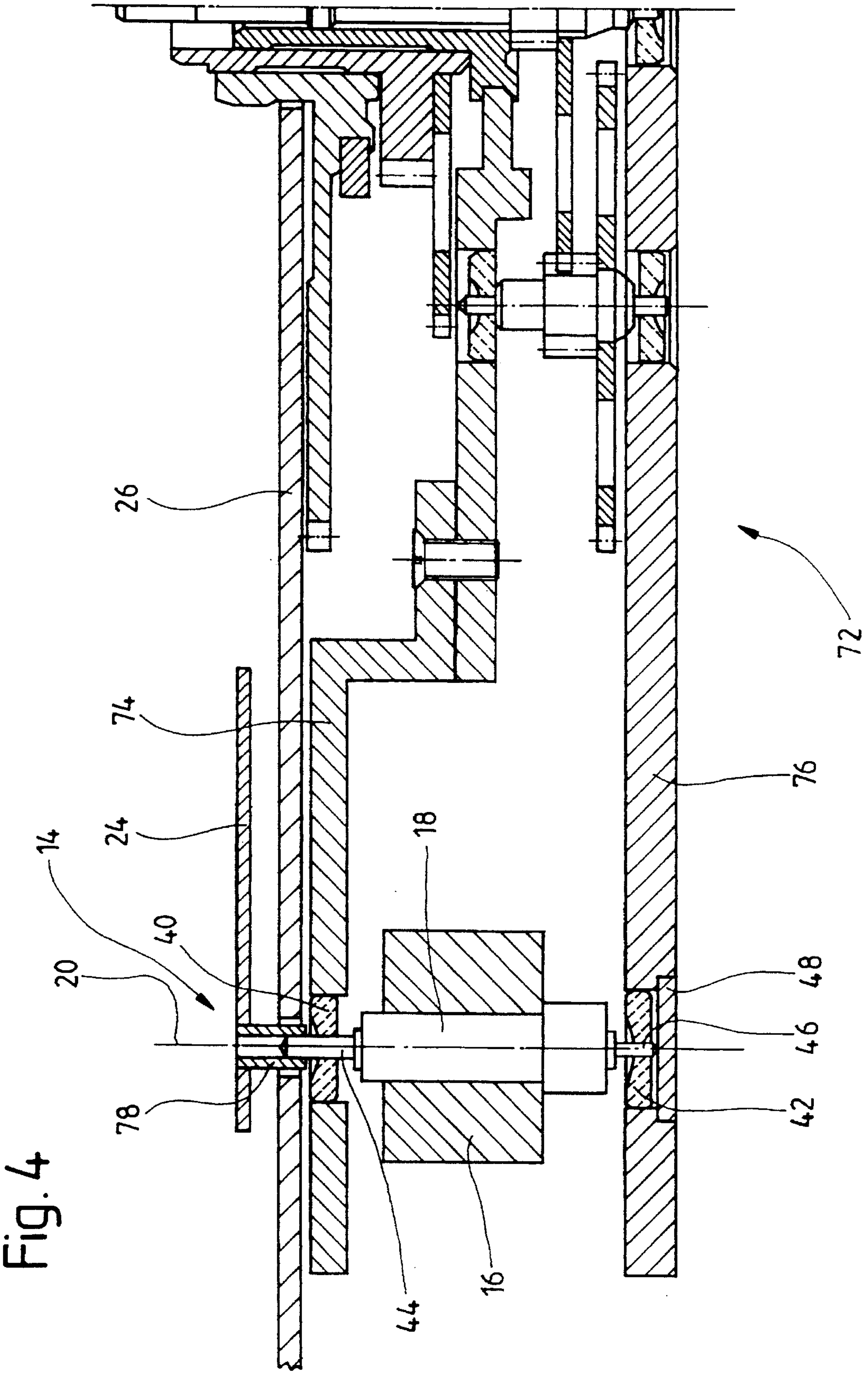
FIG. 4 is a partial cross-section of a second embodiment of the invention.
Figure 5:
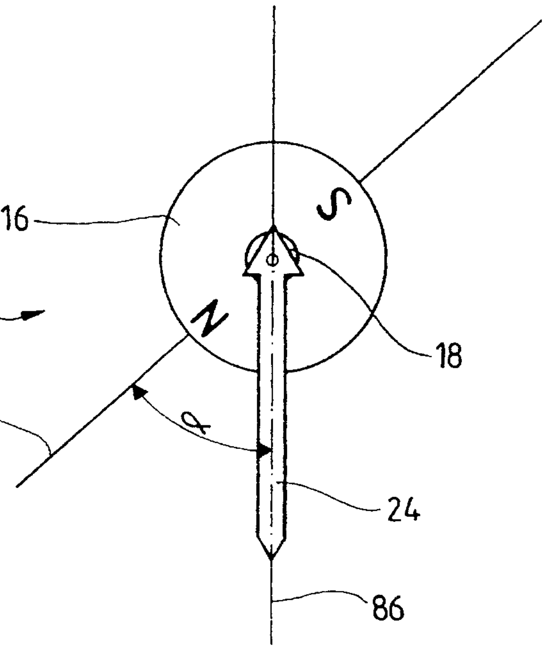
FIG. 5 is a schematic view from above of the placing of the terrestrial magnetic north indicating arrangement according to the invention.

On FIG. 4 is partially shown a second embodiment of a watch according to the invention.

In this second embodiment, the arrangement for indicating the magnetic north 14 is fitted into the horological movement 72.

The referenced parts already described on FIGS. 1 to 3 will not again be here described in detail.

Shaft 18 of the arrangement 14 on which is mounted permanent magnet 16 is fitted between a first piece 74 and a second piece 76 of the horological movement framework 72. Bearings 40 and 42 are fitted into two openings provided respectively for this purpose in pieces 74 and 76 of the horological movement. Again, pivot 46 of shaft 18 bears on the endstone 48 while pivot 44 traverses bearing 40 in the direction of dial 26. The axis 78 of hand 24 forming the direction indicator of the arrangement 14 is rigidly secured to pivot 44.

Shaft 18 and magnet 16 are thus entirely comprised within the thickness of the horological movement 72. Hand 24 is again arranged above dial 26.

When the horological movement comprises magnetic masses, the flow direction of the terrestrial magnetic flux in a region neighbouring the magnetic masses is modified by the presence of such magnetic masses. Additionally, the disturbance in the direction of the magnetic axis of the permanent magnet brought about by the presence of the magnetic masses varies as a function of during assembly of the direction indicator 24 along the north-south direction of the undisturbed terrestrial magnetic field. To accomplish this, it is in particular possible to use a frame of reference indicating precisely the north-south direction of the undisturbed terrestrial magnetic flux. Once the horological movement (not shown) and dial 82 are correctly positioned, hand 24 constituting the direction indicator mentioned above is mounted on the shaft 18 of the arrangement 14 in a way such that the longitudinal axis 86 of such hand 24 is aligned on marker 84, that is to say, so that such longitudinal axis 86 is oriented according to the direction given by arrow 85 of the positioning reference marker 84.

There results from what has just been hereinbefore described that the longitudinal axis 86 of the direction indicator 24 and arrow 85 of the positioning reference marker 84 indicate correctly and precisely the direction of the terrestrial magnetic north when the longitudinal axis 86 is aligned on the positioning reference marker 84.

It will be noted that the positioning reference marker 84 can be formed by any means defining at least one point on which the direction indicator is apt to be aligned. Given that the direction indicator 24 turns around its rotation axis 20, a single positioning point enables the definition of a direction given for the longitudinal axis 86 of the direction indicator 24. Thus, when the positioning reference marker defines a geometric figure other than a point, it is provided that such geometric figure exhibits a general direction intercepting the rotation axis 20.

Thanks to the layout of the arrangement 14 for indicating the direction of the terrestrial magnetic north according to the invention, the disturbance brought about by the magnetic masses of the horological movement on the terrestrial magnetic flux traversing the region in which the permanent magnet 16 of arrangement 14 is localized, is corrected when the direction indicator 24 of arrangement 14 is aligned on the positioning reference marker 84 provided in the watch according to the invention.

Thus, when the direction indicator 24 does not have its longitudinal axis 86 aligned on the positioning reference marker 84, the direction indicator 24 no longer indicates the direction of the terrestrial magnetic north in a precise manner, this the more so as the angular separation between the longitudinal axis 86 of the direction indicator 24 and the direction defined by the positioning reference marker 84 is large.

Figure 6:
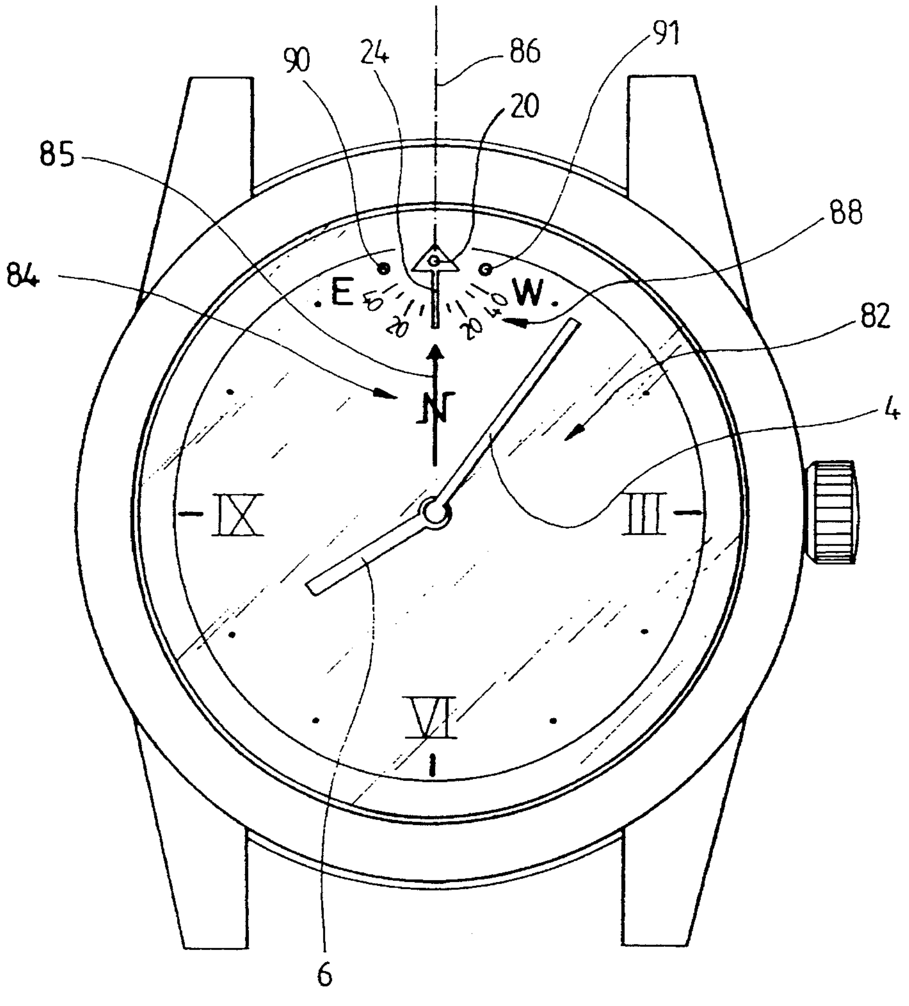
FIG. 6 is a schematic view from above of a variant embodiment of a dial of a watch according to the invention.

In order to permit the direction indicator 24 to indicate the direction of geographical north, there has been provided on dial 82 graduation 88 defining a scale of magnetic declinations. The declination at a given place on the surface of the terrestrial globe corresponds to the geographical azimuth of the magnetic north, that is to say, is equal to the angle formed between the direction of the geographical north and the direction of the magnetic north. In knowing the magnetic declination of the place in which the user of the watch shown on FIG. 6 is located, it is possible to align the longitudinal axis 86 of the direction indicator 24 on the division corresponding to such magnetic declination. On FIG. 6, the portion of the graduation 88 located to the right of the direction indicator 24 corresponds to negative magnetic declinations, that is to say, to magnetic declinations west W, while the portion of graduation 88 located to the left of such direction indicator 24 corresponds to positive magnetic declinations, that is to say, to magnetic declinations east E.

As a first approximation, graduation 88 is linear. However, in a preferred embodiment, a graduation 88 is provided arranged in a manner such that the angle formed between the division corresponding to a null magnetic declination and another division corresponding to a nonnull magnetic declination relative to the rotation axis 20 of the direction indicator 24 integrates the disturbance over the terrestrial magnetic flux flowing in the region of the permanent magnet when the horological movement comprises magnetic masses 60.

Here it will be noted that in the case in which the horological movement comprises no magnetic mass, angle $\alpha$ between the magnetic axis 38 of the permanent magnet 16 and the longitudinal axis 86 of the direction indicator has a null value and graduation 88 enabling the taking into account of the magnetic declination is then linear.

In the embodiment of FIG. 6, there are provided two stops 90 and 91 serving to limit the travel of the direction indicator 24. As appears on such FIG. 6, it will be noted that the rotation axis 20 of the direction indicator 24 is located at the edge of the dial 82 of the watch and that the hand constituting the direction indicator 24 is oriented in the direction of the center of dial 82 when such hand is aligned on arrow 85 of the positioning reference marker 84. Thus, the layout of the arrangement according to the invention permits good reading of the magnetic north direction with the help of the direction indicator 24, while having the permanent magnet of the arrangement 14 for indicating the terrestrial magnetic north located at the edge of the watch according to the invention, that is to say, in the lateral peripheral region of the horological movement comprised in such watch. The direction indicator 24 is formed from a non-magnetic material. Thereby, the presence of such direction indicator 24 proximate the magnetic masses of the horological movement in no manner upsets the precision and the sensitivity of the arrangement for indicating the magnetic north according to the invention.

With the help of FIGS. 7 to 9, there will be described hereinafter a third embodiment of a watch according to the invention serving to follow a predetermined direction.

Watch 94 comprises an arrangement 14 for the indication of the terrestrial magnetic north according to the invention. Watch 94 is a wristwatch intended to be worn on the wrist of a user. Such watch comprises a dial 96 located within a case 98.

The arrangement 14 comprises a direction indicator 24 associated with a positioning reference marker 100 formed by an interval defined with the help of two annular sectors. On dial 96 is provided graduation 102 forming at least partially a windrose. Axis 20 of the arrangement 14 is positioned on the division corresponding to the indication of the north direction. The projection of the rotation axis 20 on dial 96 and the interval defining the positioning reference marker 100 are aligned on the north-south direction of the graduation 102.

According to the invention, case 98 in which is fitted dial 96 and the horological movement (not shown) of watch 94 may undergo a rotation around the central axis 104 relative to the bracelet 106 of watch 94. In order to accomplish this, case 98 is rotatably mounted on support 110 fixedly coupled to the bracelet 106. By way of example, the arrangement enabling rotation of case 98 relative to support 110 comprises a toothed wheel fixed to case 98 and at least one angular positioning pawl for such wheel fixed,to support 110. Any other arrangement known to persons skilled in the art, in particular arrangements equivalent to the arrangements used for watches comprising a rotating bezel, can be used in the fitting out of watch 94.

It will be noted that graduation 102 comprises at least four divisions corresponding to the four cardinal points of the terrestrial globe, the division indicating the north direction being given by the positioning reference marker 100 and by the rotation axis 20. Watch 94 described on FIGS. 7 to 9 permits easily following a course, that is to say, a predetermined direction when the watch is worn by a user.

With the help of FIGS. 7 to 9, there will be described hereinafter in what manner watch 94 can be used in order to follow a course. When watch 94 is used for time indication, the rotation axis 20 of the arrangement 14 is angularly positioned relative to the rotation axis 104 of case 98 in a predetermined position. On FIG. 7, such predetermined position corresponds to the twelve o'clock position of watch 94 relative to support 110. When a user wishes, on the other hand, to use watch 94 in order to follow a predetermined direction, for example the south-west direction, he will drive case 98 of watch 94 in rotation until division 112 of graduation 102 corresponding to the south-west direction is angularly positioned on the twelve o'clock position of the support 110 of watch 94. Next, the user arranges his forearm 114 in front of the trunk of his body in a manner such that such forearm is substantially horizontal and the watch is located facing his head. Then, as is shown on FIG. 9, the user will effect a rotation of himself until the direction indicator 24 is aligned on the positioning reference marker 100. Thus, the predetermined direction which the user has chosen to follow corresponds to the direction given by division 112 of graduation 102 relative to the center of such circular graduation which coincides with the rotation axis 104 of case 98. This direction then corresponds to the natural walking direction of the user of watch 94.

In order to follow the direction which he has chosen, the user will see to it that the direction indicator 24 remains aligned on the positioning reference marker 100. In the case in which the place in which the user of watch 94 is located exhibits a magnetic declination and that a graduation permitting to take into consideration such magnetic declinations is provided, the user will see to it that the direction indicator 24 is aligned on the division of such graduation corresponding to the magnetic declination of the place in which the user of watch 94 is located.

With the help of FIG. 10, there will be described hereinafter a third embodiment of a watch according to the invention intended to indicate the direction of a predetermined place relative to at least one other given place.

Watch 120 according to such third embodiment comprises a case 122 including a rotatable bezel 124. The two hands 126 and 127 enable an analog display of the time of day. Again, watch 120 comprises an arrangement 14 for the indication of the direction of the terrestrial magnetic north equivalent to those described previously, and the dial 128 again comprises a positioning reference marker 125 associated with the direction indicator 24.

In the example shown on FIG. 10, watch 120 is arranged so as to permit a user to determine the direction of Mecca from a set of cities inscribed on dial 128 and with which are respectively associated angular reference markers 130 defining an angular position in the plane of the dial 128 relative to the rotation axis 132 of the turning bezel 124. The angle formed in the plane of dial 128 by a given index 130, the rotation axis 132 of the rotating bezel and the rotation axis 20 of the direction indicator 24 corresponds to the magnetic azimuth between the direction of Mecca and the direction of the magnetic north at the place defined by the city corresponding to the given angular reference marker 130.

In order to determine correctly the direction of Mecca from a city inscribed on dial 128, it is foreseen to move bezel 124 in rotation until the marker 134 and the angular reference marker 130 of the city in which the user is located are aligned with the projection on dial 128 of the rotation axis 132. Next, watch 120 is rotated by the user until the direction indicator 24 is aligned on reference marker 125 as has already been described previously. Once the direction indicator 24 is aligned on reference marker 125, the direction of Mecca corresponds to the direction defined by reference marker 134 provided on the rotating bezel 124 and the rotation axis 132 of such rotating bezel. In order to facilitate determination of the correct direction of Mecca for the user, there has been provided a reference marker 136 pointing in the direction of Mecca on the rotating bezel 124 opposite the reference marker 134 relative to the rotation axis 132. Thus, the direction determined by reference markers 134 and 136 easily enables a user to determine the direction of Mecca.

Here it will be noted that in a variant of the embodiment it is provided that case 122 comprising dial 128, the terrestrial magnetic north indicating arrangement 14 (partially shown) and the horological movement (not shown) provided within case 122 are adapted to undergo a rotation relative to the bracelet (not shown) of watch 120.

What we claim is:

1. A watch comprising an horological movement, a case within which said horological movement is fitted, and means for indicating the terrestrial magnetic north also fitted within said case; said terrestrial north indicating means comprising a bipolar permanent magnet mounted on a shaft defining a rotation axis, and a direction indicator rigidly fixed to said permanent magnet and made of a non-magnetic material; said direction indicator having a longitudinal dimension which is perpendicular to said rotation axis and which defines the direction indicated by said direction indicator; said permanent magnet exhibiting a radial magnetization defining a magnetic axis which is substantially perpendicular to said rotation axis and which is located within a peripheral region of said case, said longitudinal dimension of said direction indicator being eccentric relative to said rotation axis, said direction indicator having a rotational movement which is limited so that a larger longitudinal part of said direction indicator measured from said rotation axis and partially defining said longitudinal dimension is located in a circular sector oriented substantially in a direction of the center of said watch relative to said rotation axis.

2. A watch as set forth in claim 1, wherein said direction indicator is located between a dial and a crystal of said watch, and said permanent magnet is located between said dial and a back cover of the watch.

3. A watch as set forth in claim 1, wherein said permanent magnet is located in a lateral peripheral region exterior to said horological movement.

4. A watch as set forth in claim 1, wherein said permanent magnet is located in a lateral peripheral region within said horological movement, said shaft carrying said permanent magnet having two pivots respectively mounted in two bearings fitted into said horological movement.

5. A watch as set forth in claim 1, comprising a power cell, said permanent magnet being located in a region of said case which, relative to a central axis of said horological movement, is opposite the region in which said power cell is localized.

6. A watch comprising an horological movement with magnetic masses, a case within which such horological movement is fitted, and means for indicating the terrestrial magnetic north also fitted within said case; said terrestrial north indicating means comprising a bipolar permanent magnet mounted on a shaft defining a first rotation axis and a direction indicator rigidly fixed to said permanent magnet; said permanent magnet exhibiting a radial magnetization defining a magnetic axis substantially perpendicular to said first rotation axis, said permanent magnet being located within a lateral region peripheral to said horological movement, said direction indicator defining a longitudinal axis and being associated with a positioning reference marker along which said longitudinal axis is adapted to align itself, said permanent magnet magnetic axis and said direction indicator longitudinal axis exhibiting an angular separation having a value which is a function of said magnetic masses and of the position of said positioning reference marker relative to said first rotation axis, said value being determined in a manner such that said direction indicator indicates precisely the direction of the terrestrial magnetic north when its longitudinal axis is aligned on said positioning reference marker.

7. A watch as set forth in claim 6, comprising first graduations associated with said direction indicator, such graduations enabling the identification of at least the four cardinal compass points.

8. A watch as set forth in claim 7, wherein the direction defined in the general plane of the watch by said first rotation axis and said positioning reference marker corresponds to the north-south direction of said first graduations.

9. A watch as set forth in claim 6, serving to indicate the direction of Mecca, comprising means for indicating the direction of Mecca capable of undergoing a rotation around a second rotation axis perpendicular to the general plane of the watch, such second rotation axis defining a point representative of the geographical position of Mecca projected onto said general plane of the watch, said watch having at least one angular reference marker representative of a place or a region of Earth onto which a direction reference marker belonging to said means for indicating the direction of Mecca is capable of aligning itself, the direction of Mecca being provided by such direction reference marker whenever the latter is aligned on said angular reference marker corresponding to the place where the user of said watch is located and said longitudinal axis of said direction indicator is aligned on said positioning reference marker.

10. A watch as set forth in claim 9, having a set of angular reference markers corresponding to a set of cities and onto each of which said direction reference marker is adapted to be aligned, such angular reference markers being laid out around said second rotation axis.

11. A watch as set forth in claim 7, said first graduations being laid out on an element of said case, such case being rotatably mounted on a support fixedly coupled to a bracelet of such watch, said case being capable of rotation relative to said support so as to position any division whatsoever of said graduations in the 12 o'clock position of said watch.

12. A watch as et forth in claim 6, comprising second graduations defining a scale of magnetic declination, such second graduations being associated with said direction indicator in a manner such that said longitudinal axis of such direction indicator may align itself on any division whatsoever of such second graduations.

* * * * *